United States Patent [19]

Burns

[11] Patent Number: 4,668,324

[45] Date of Patent: May 26, 1987

[54] METHOD OF MAKING WOOD VENEER VEHICLE INTERIOR

[76] Inventor: Johnthan. D. Burns, 5704 Sunset Rd., Fort Worth, Tex. 76114

[21] Appl. No.: 773,981

[22] Filed: Sep. 9, 1985

[51] Int. Cl.[4] .............................................. B32B 31/18

[52] U.S. Cl. .................................... 156/247; 156/249; 156/250; 156/306.6; 76/107 C; 428/31; 428/40; 428/106; 428/151

[58] Field of Search ............... 156/245, 247, 249, 250, 156/257, 306.3, 306.6, 510, 528, 530, 581; 248/27.1; 280/752; 428/31, 40, 106, 151; 76/107 C; 83/30, 31, 32, 40, 55; 296/70, 72

[56] References Cited

U.S. PATENT DOCUMENTS

| | | | |
|---|---|---|---|
| 3,011,932 | 12/1961 | Downing | 156/249 |
| 3,423,276 | 1/1969 | Eckenroth | 428/31 |
| 3,729,368 | 4/1973 | Ingham et al. | 156/247 |
| 3,869,332 | 3/1975 | Loew | 428/31 |
| 3,977,933 | 8/1976 | Sadashige | 156/250 |
| 4,145,465 | 3/1979 | Sanderson et al. | 156/306.6 |
| 4,226,143 | 10/1980 | Whitecotton et al. | 76/107 C |
| 4,326,434 | 4/1982 | Mohr et al. | 76/107 C |
| 4,388,133 | 6/1983 | Hirao et al. | 156/245 |
| 4,465,539 | 8/1984 | Saihara et al. | 156/250 |

*Primary Examiner*—Caleb Weston
*Attorney, Agent, or Firm*—Charles D. Gunter, Jr.

[57] ABSTRACT

A method manufacturing an exposed portion of a vehicle interior having a real wood appearance is shown. A desired wood finish is first applied to a selected surface of a sheet of wood veneer. A laminate backing is then applied to the wood veneer surface opposite the finished surface, the laminate backing comprises a peel-off adhesive backing. An overlay is then formed of the vehicle interior portion in a desired shape by stamping the laminated wood veneer with a steel rule die, the steel rule die being patterned in the desired shape. The adhesive backing is then peeled from the overlay and the backing surface of the wood veneer is then applied to a selected location within the vehicle interior so that the finished surface of the wood veneer is exposed.

5 Claims, 4 Drawing Figures

METHOD OF MAKING WOOD VENEER VEHICLE INTERIOR

BACKGROUND OF THE INVENTION

1. Field of the Invention

The present invention relates to a method for providing an overlay for an exposed portion of a vehicle interior and, specifically, to a wood veneer overlay and method of manufacture for providing exposed portions of a vehicle interior with a real wood appearance.

2. Description of the Prior Art

In the past, various techniques have been used to affix wood sheets or panels within a vehicle interior, such as the interior of a car, truck or boat, to enhance the esthetic appearance of the vehicle. In some applications, a sheet or panel of wood was formed in the appropriate shape and affixed by screws to the instrument console, or other portion of the vehicle interior. Although this technique provided a real wood cosmetic effect, the wood sheets or panels were very expensive and, because of the thickness of the panels, required modification of the underlying exposed vehicle surface.

In other prior art vehicle customization techniques, plastic, simulated wood sheets or panels were affixed within the vehicle interior, such as about the instrument console of a car or a truck. These modifications were less expensive, but did not provide a true "real wood" appearance, and the plastic materials tended to warp or deteriorate with time.

It is also known to use wood veneers in various furniture making techniques, where the wood veneer is bonded to an underlying substrate with contact cement or with hot melt glues or adhesives. I am not familiar with prior art techniques, in the furniture manufacturing area or otherwise, in which wood veneers are bonded to underlying substrates through the use of a peel-off adhesive.

This invention has as its object the provision of a manufacturing method for providing exposed portions of a vehicle interior with a real wood appearance.

Another object of the invention is to provide such a real wood appearance at a low cost and without requiring modification of the underlying vehicle interior portions.

SUMMARY OF THE INVENTION

The objects of the present invention are met through a method of manufacturing an exposed portion of a vehicle interior in which a desired wood finish is first applied to a selected surface of a thin sheet of wood veneer. A peel-off adhesive, laminate backing is then applied to the wood veneer surface opposite the finished surface, as by running the backing and the sheet of wood veneer through a pair of press rollers, whereby the laminated product so produced has a finished wood exposed surface and a peel-off adhesive backing.

An overlay of the vehicle interior portion to be customized is then formed in a desired shape by stamping the laminated wood veneer product with a steel rule die. The steel rule die is patterned in the desired shape of the vehicle interior portion which is to be customized. The adhesive backing is then peeled from the wood veneer overlay and the backing surface of the overlay is applied to a selected location within the vehicle interior so that the finished surface of the wood veneer is exposed.

Additional objects, features and advantages will be apparent in the written description which follows.

DETAILED DESCRIPTION OF THE INVENTION

Figure 1:
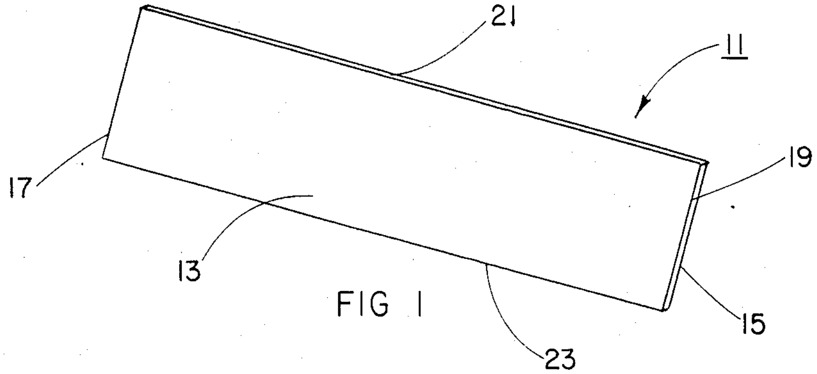
FIG. 1 is a front, prospective view of a sheet of wood veneer of the type used in the method of the invention.

FIG. 1 shows a sheet of wood veneer, designated generally as 11, of the type used in practicing the method of the invention. The sheet of veneer 11 has a first, planar surface 13, which will be referred to herein as the exposed surface, and an opposite planar surface 15. The sheet 11 also has a leading edge 17, a trailing edge 19 and top and bottom edges 21, 23, respectively.

The sheet of wood veneer 11 is preferably provided in a sheet approximately 24 inches wide and approximately 8 feet long. The thickness of the sheet, defined as the distance between the planar surfaces 13, 15, is preferably in the range from about 0.005 to 0.125 inches, and most preferably is about 0.015 inches. The preferred material for the veneer sheet 11 is Honduras mahogany which has a blond, chalky appearance before finishing. The exposed surface 13 of the sheet of wood veneer is first finished by applying a desired wood finish, such as a Danish oil stain to the wood veneer. The Danish oil stain is absorbed into the wood surface without destroying the view of the wood grain. After a coat of strain is applied, the exposed surface 13 is lightly sanded by hand and a coat of Tong oil is applied. The exposed surface is then again lightly sanded and another coat of Tong oil is applied.

After the exposed surface 13 has been finished as desired, a laminate backing (25 in FIG. 2) is applied to the opposite planar surface 15 of the sheet of wood veneer 11. The laminate backing 25 is comprised of a peel-off adhesive layer which can be commercially purchased in a roll approximately 24 inches wide. The preferred peel-off adhesive backing utilizes an acrylic adhesive and can be obtained commercially from the industrial specialties division of 3M Corporation, 220-7 E 3M Center, Saint Paul, Minn. The "A10 Acrylic Adhesive" and the "VHB Tape Fastener" are acceptable for the present purpose.

The "A10" product is an acrylic pressure-sensitive joining system which is used in general industrial applications where high bond strength, excellent temperature and solvent resistance and outstanding shear strength properties are required. This product can be obtained as a laminate backing that is approximately 0.005 inches (0.13 mm) thick and includes a release liner of tan paper which is approximately 0.004 inches (0.10 mm) thick. The adhesive utilized is "Isotac" acrylic adhesive.

Figure 2:
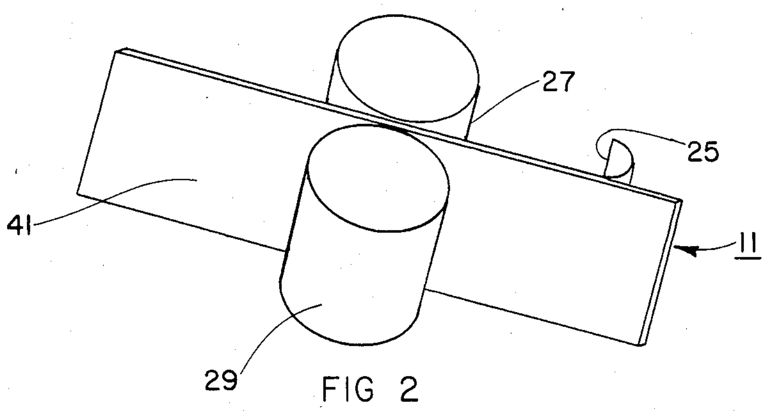
FIG. 2 schematically illustrates the lamination of the sheet of wood veneer with a peel-off adhesive backing.

FIG. 2 illustrates the preferred method of applying the laminate backing 25 to the sheet of wood veneer 11. This is preferably accomplished by passing the peel-off adhesive tape 25 and the sheet of wood veneer 11 through a pair of press rollers 27, 29 to produce the laminated wood veneer product. The wood veneer product from the press rollers 27, 29 is then blanked-out into rectangles of the approximate size for overlaying the vehicle interior portion to be customized.

Figure 3:
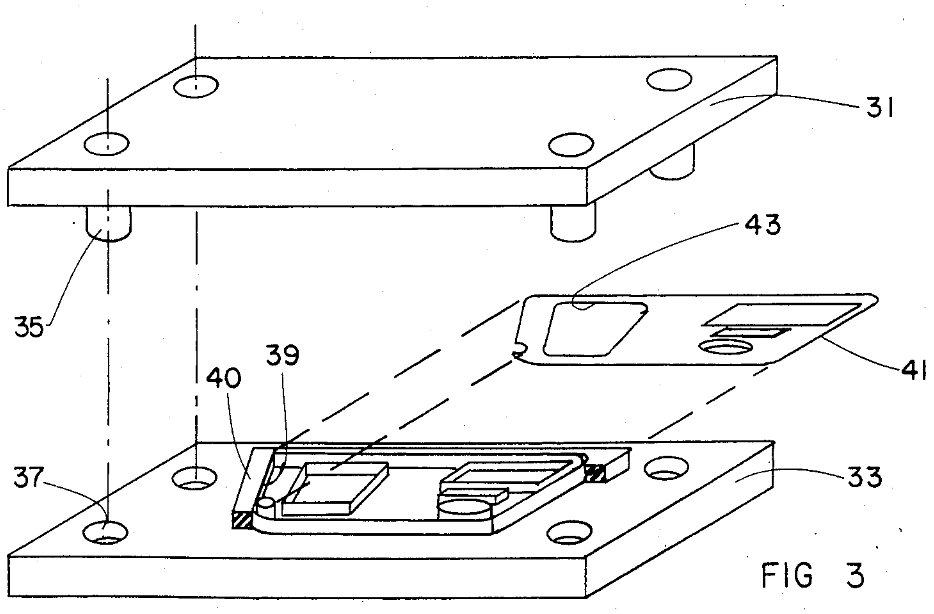
FIG. 3 illustrates a steel rule die of the type used to form an overlay of the wood-laminate of the invention.

As shown in FIG. 3, a steel rule die is then used to form an overlay of the vehicle interior portion in a desired shape by stamping the laminated wood veneer with a steel rule die, the steel rule die being patterned in the desired shape. Steel rule dies are known to those skilled in the art and include a master die set comprising a top shoe 31, a bottom shoe 33, and guide posts 35 which are received within guide openings 37, so that the top shoe 31 will be guided for accurate translatory movement perpendicular to the lower shoe 33.

The steel rule die also includes die blades 39 formed from steel rule approximately 0.112 to about 0.140 inches thick and from about ⅞ to 1⅛ inches high. The die blades extend through the lower shoe 33 and the exposed portions of the blades are surrounded with a resilient cushion 40 (shown broken away in FIG. 3) which extends nearly the complete height of the exposed blades.

As shown in FIG. 3, the steel rule die blades are laid out in a pattern for cutting openings in the wood veneer laminate product 41. This operation is best carried out by mounting the shoes in a suitable jig or die set. The upper and lower shoes are rapidly forced together so that the steel rule die produces an exact impression of the cutting elements of the lower shoe 33 in the wood laminate product 41. A suitable steel rule die and method for making the same is shown in U.S. Pat. No. 4,226,143, issued Oct. 7, 1980, to Whitecotton et al., the disclosure of which is incorporated herein by reference.

Figure 4:
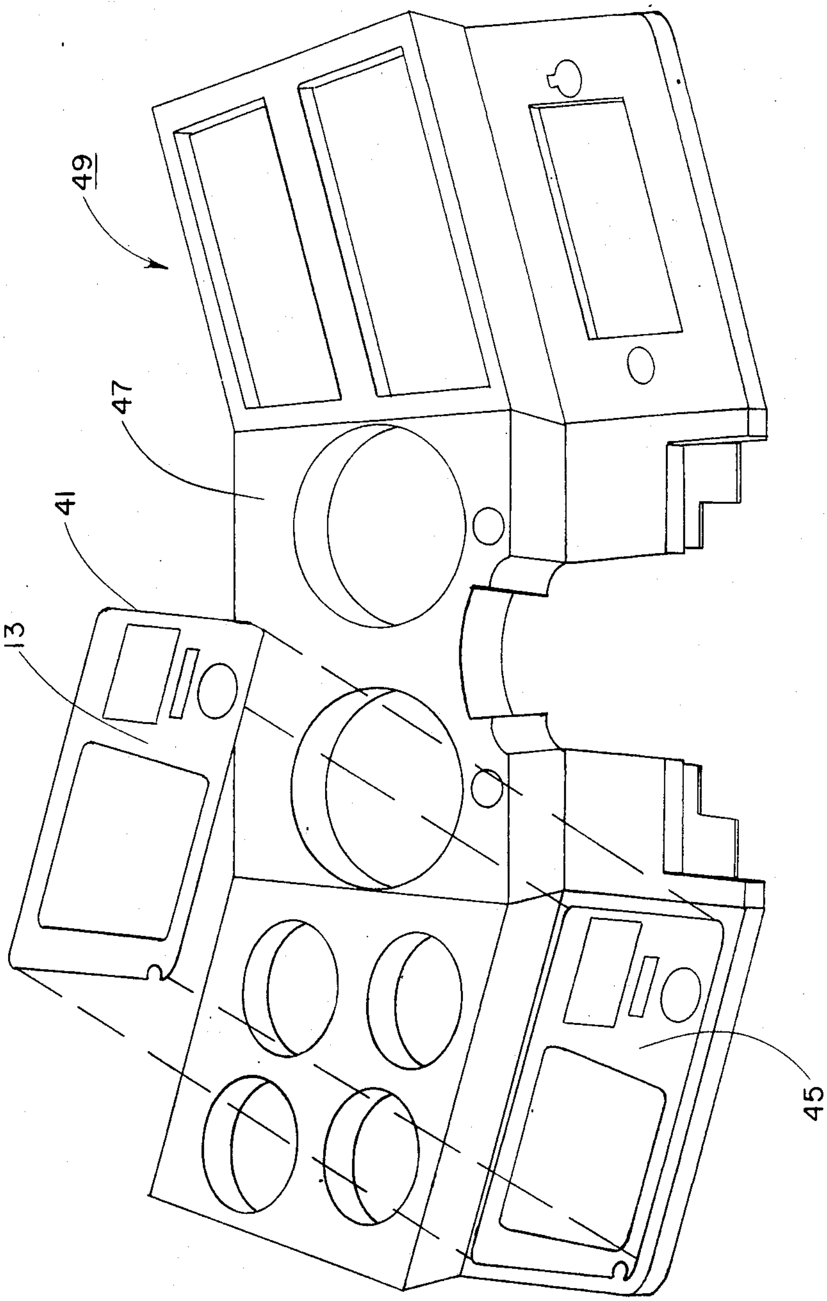
FIG. 4 is a front, perspective view of a vehicle console base showing the application of the laminate overlay of the invention.

The wood veneer laminate product 41 is then removed from the steel rule die and the appropriate openings (43 in FIG. 3) are punched out. The adhesive backing paper is then peeled from the wood veneer laminate product and, as shown in FIG. 4, the overlay product 41 is then applied to a selected location within the vehicle interior so that the finished surface 13 of the wood veneer is exposed. In the example shown in FIG. 4, the overlay product 41 is applied to a location 45 on a plastic base 47 of an instrument panel console, designated generally as 49.

An invention has been provided with several advantages. The method of the invention provides a quick and relatively inexpensive manufacturing technique for providing a "real wood" appearance to exposed portions of a vehicle interior. Because a peel-off adhesive backing is utilized, the wood veneer overlay product of the invention can be applied either at the manufacturing plant, or later by an end user. Because only a thin sheet of wood veneer is utilized, the cost of expensive wood is reduced, while maintaining an exposed surface of real wood grain. The peel-off adhesive backing has been found superior to other techniques, such as contact cement, in case of application and appearance of the finished article. The acrylic adhesive utilized in the backing does not revert with age but maintains a superior bond to the underlying substrate with time. The use of a steel rule die for forming the wood veneer overlay of the desired shape is superior to other manufacturing techniques and cleanly cuts openings in the overlay without leaving ragged edges or smearing the adhesive backing.

While the invention has been shown in only one of its forms, it is not thus limited but is susceptible to various changes and modifications without departing from the spirit thereof.

I claim:

1. A method of manufacturing an exposed portion of a vehicle interior having a real wood appearance, comprising the steps of:

applying a desired wood finish to a selected surface of a sheet of wood veneer;

applying a laminate backing to the wood veneer surface opposite the finished surface, the laminate backing comprising a peel-off adhesive backing;

forming an overlay of the vehicle interior portion in a desired shape by stamping the laminated wood veneer with a steel rule die, the steel rule die being patterned in the desired shape; and peeling off the adhesive backing and applying the backing surface of the wood veneer overlay to a selected location within the vehicle interior so that the finished surface of the wood veneer is exposed.

2. The method of claim 1, wherein the thickness of the sheet of wood veneer is the range from about 0.005 to 0.125 inches.

3. The method of claim 2, wherein the adhesive backing contains an acrylic adhesive.

4. A method of manufacturing an exposed portion of a vehicle interior having a real wood appearance, comprising the steps of:

applying a desired wood finish to a selected surface of a sheet of wood veneer by staining, sanding and then oiling the selected surface;

applying a peel-off adhesive, laminate backing to the wood veneer surface opposite the finished surface by running the backing and the sheet of wood veneer through a pair of press rollers, whereby the laminated product so produced has a finished wood exposed surface and a peel-off adhesive backing;

forming an overlay of the vehicle interior portion in a desired shape by stamping the laminated wood veneer product with a steel rule die, the steel rule die being patterned in the desired shape; and peeling off the adhesive backing and applying the backing surface of the wood veneer overlay to a selected location within the vehicle interior so that the finished surface of the wood veneer is exposed.

5. A method of manufacturing a vehicle instrument console having a real wood appearance, comprising the steps of:

applying a desired wood finish to a selected surface of a sheet of wood veneer by staining, sanding and then oiling the selected surface, the sheet of wood veneer having a thickness in the range from about 0.005 to 0.125 inches;

applying a peel-off adhesive, laminates backing to the wood veneer surface opposite the finished surface by running the backing and the sheet of wood veneer through a pair of press rollers, whereby the laminated product so produced has a finished wood exposed surface and a peel-off adhesive backing;

forming an overlay of the vehicle interior portion in a desired shape by stamping the laminated wood veneer product with a steel rule die, the steel rule die being patterned in the desired shape; and peeling off the adhesive backing and applying the backing surface of the wood veneer overlay to a selected location on the instrument console so that the finished surface of the wood veneer is exposed.

* * * * *